United States Patent

Hance

[15] 3,664,882
[45] May 23, 1972

[54] IMMERSION TEMPERATURE RESPONSIVE DEVICE
[72] Inventor: Richard James Hance, Philadelphia, Pa.
[73] Assignee: Leeds & Northrup Company, Philadelphia, Pa.
[22] Filed: Sept. 24, 1969
[21] Appl. No.: 860,518

[52] U.S. Cl............................................136/234, 136/235
[51] Int. Cl. ...........................................................H01v 1/02
[58] Field of Search ...............................136/234, 237, 235

[56] References Cited

UNITED STATES PATENTS

| | | | |
|---|---|---|---|
| 3,347,099 | 10/1967 | Schraeder | 136/234 X |
| 3,374,122 | 3/1968 | Cole | 136/234 |
| 3,451,863 | 6/1969 | Gee | 136/234 |
| 3,508,976 | 4/1970 | Parker, Jr. | 136/234 |
| 3,531,331 | 9/1970 | Davies | 136/234 |

FOREIGN PATENTS OR APPLICATIONS

| | | | |
|---|---|---|---|
| 681,508 | 3/1964 | Canada | 136/234 |

OTHER PUBLICATIONS

The Instrument World, March 1929, pp. 332, 333.

*Primary Examiner*—Carl D. Quarforth
*Assistant Examiner*—Harvey E. Behrend
*Attorney*—Woodcock, Washburn, Kurtz & Mackiewicz

[57] ABSTRACT

An expendable plug-in immersion temperature responsive assembly. This assembly has a body structure including an enlarged hollow body portion which provides a heat shield for the plug-in contact structure and which produces a buoyant force serving to indicate when the heat sensing portion is immersed to a proper depth in a bath of molten material.

1 Claims, 2 Drawing Figures

Patented May 23, 1972 3,664,882

IMMERSION TEMPERATURE RESPONSIVE DEVICE

BACKGROUND OF THE INVENTION

1. Field of the Invention

Applicant's invention is for an improved assembly useful in the fields of measuring and testing — thermometers—particularly of the current generating or current modifying types. Thermometers of the current generating type frequently being classed with batteries — thermoelectric.

2. Description of the Prior Art

Immersion molten material temperature measuring assemblies of the type disclosed in U. S. Pat. No. 2,463,427—W. F. Richards employed a feeler wire and an electrical signaling circuit to notify an operator when the heat sensing portion of the assembly was properly immersed in a bath of molten material. Since the advent of plug-in expendable immersion thermocouple units of the type disclosed in Mead U.S. Pat. No. 2,999,121, various forms thereof have come into being. Most of such assemblies are for use in large furnaces and are designed for deep immersion into a bath of molten metal covered by a layer of slag. More recently expendable assemblies have been designed for use in slag-free baths of molten metal such as are encountered in small vacuum induction furnaces and some ladle applications. Assemblies for these latter applications must of necessity avoid the use of cardboard protective sleeves such as are commonly used in assemblies such as those disclosed in U. S. Pat. Nos. 3,024,295, 3,038,951, 3,048,642, 3,298,874, and the like in order to avoid sputter and sparks which are a hazard to an operator. Elimination of the cardboard sleeves which provided good heat insulation for the plug-in contacts has resulted in overheating of the plug-in connector parts. In accordance with applicant's invention there is provided a simplified means for detection of the proper depth of immersion of the heat sensing portion of an immersion heat sensing assembly in a bath of molten material free of slag. Also in accordance with applicant's invention overheating of the plug-in connector parts has been overcome by providing a radiation shield to protect the plug-in connector.

SUMMARY OF THE INVENTION

In accordance with applicant's invention there is provided an expendable plug-in immersion heat sensing assembly comprising a refractory body structure having an immersion end and a connector end at its end opposite the immersion end. The connector end has a hollow cup-shaped portion which surrounds a plug-in connector to prevent radiant heat from the bath of molten material being applied directly to the plug-in connector thus to prevent overheating of the connector parts.

Additionally, in accordance with applicant's invention, the immersion end of a body portion of an immersion heat sensing assembly is of relatively small cross-sectional area, said body structure having at a location displaced from the immersion end a relatively large hollow cup-shaped portion which in use will produce a buoyant force when the device is immersed into a bath of molten material thus signaling to the operator the fact that the device has been immersed to a proper level in the bath of molten material.

DESCRIPTION OF THE DRAWINGS

For an understanding of applicant's invention the following specification and claims should be read while referring to the accompanying drawings wherein:

DESCRIPTION OF PREFERRED EMBODIMENTS

Figure 1:
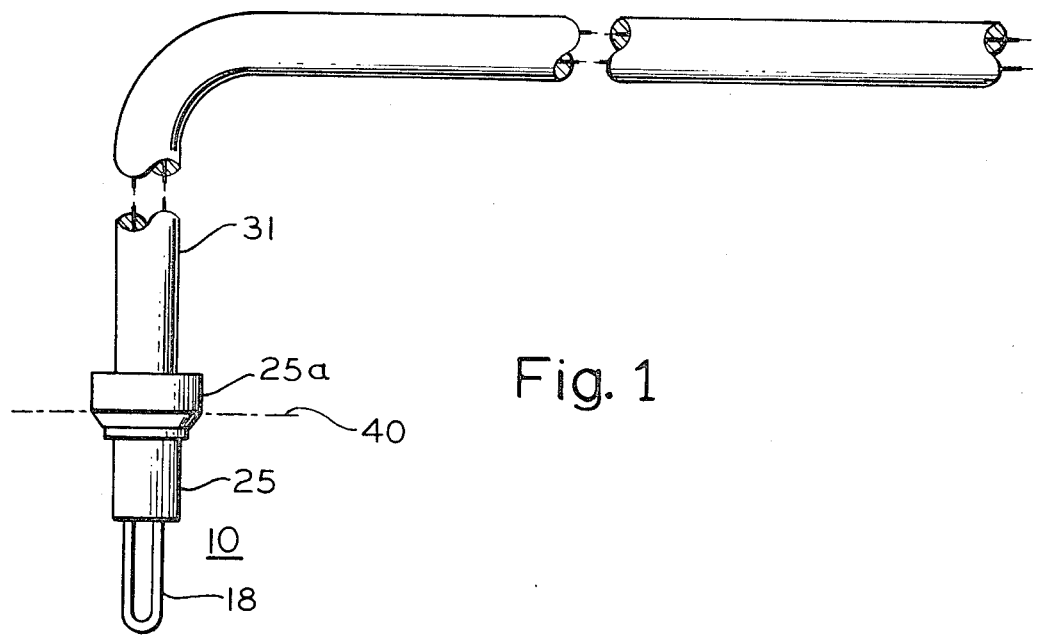
FIG. 1 is a side elevation illustrative of a plug-in expendable heat sensing assembly in accordance with applicant's invention plugged into a handle and ready for use.

Referring to FIG. 1, there is shown an expendable immersion heat sensing assembly 10 plugged into a handle or manipulator 31 as would be the case when such apparatus is ready for use. The heat sensing assembly 10, later to be described in more detail, includes an elongated "U" shaped tube 18 which houses a heat sensing element disposed in the middle of the "U." The tube 18 is supported by a body structure 25 having an enlarged cup-shaped portion 25a which shields a plug-in connector from the radiant energy given off by a bath of molten material the temperature of which is to be measured and likewise functions when the device 10 is immersed into a bath of molten material to a depth indicated by the dot-dash line 40 to provide a buoyant force which will alert an operator to the fact that the device 10 has been inserted to its proper depth.

Figure 2:
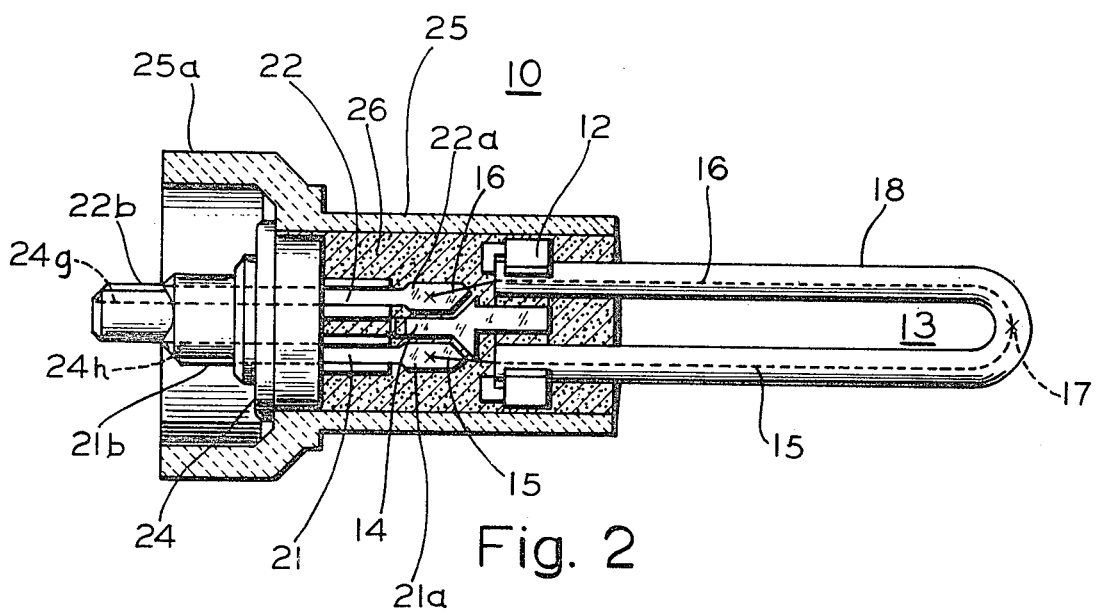
FIG. 2 is an elevation partly in section showing the interior construction of applicant's expendable immersion heat sensing assembly.

In FIG. 2 there is disclosed a suitable heat sensing assembly 10 which is preferably constructed in a manner more fully described in allowed co-pending U. S. Pat. application Ser. No. 529,533, filed Feb. 23, 1966 by R. E. Davies, now U.S. Pat. No. 3,531,331 and assigned to applicant's assignee. In the present application elements of structure which correspond in function to those more fully described in the co-pending application of Davies have been given reference numbers corresponding to those employed in FIGS. 2 and 3 of the Davies application, now U.S. Pat. No. 3,531,331.

As may be seen in applicant's FIG. 2, the assembly 10 includes a heat sensing subassembly 12. This heat sensing subassembly comprises a heat sensing element 13 and a support member 14 therefore. The heat sensing element 13 has been illustrated in the form of a thermocouple including a pair of serially connected thermocouple wires 15 and 16 joined as by a weld to form a hot junction 17. The thermocouple wires 15 and 16 and the hot junction 17 are encased in a heat transmitting electrically insulating refractory material 18 which may take the form of a bent quartz or high temperature glass tube.

The support member 14 includes a body portion which has extending from one end thereof a semi-circular or "V" shaped arm structure which receives the free ends of the bent tube 18 to hold the bent tube 18 substantially rigid with the support member 14. The support member 14 additionally includes flexible wall portions, all as more fully described in the aforesaid Davies co-pending application, which grip and support electrical conductors 21 and 22. Ends 21a and 22a of the electrical conductors 21 and 22 are flattened and have secured thereto, as by welding at points labeled X, the thermocouple wires 15 and 16. The other ends of conductors 21 and 22 pass through holes in a connector body 24 which is made of a plastic which will function at high temperature or other suitable material. These holes terminate in slots 24h and 24g from which the portions 21b and 22b protrude to form male plug-in contacts of a plug-in connector. A body portion 25 contains the above described parts which are embedded in a refractory cement 26 which holds the parts together to form a unitary device. The female portion of the connector is carried in the end of a manipulator 31 (FIG. 1) in a manner well known to those skilled in the art and as clearly described in cited references.

The inner details of construction of assembly 10 form no part of the present invention and may be like those fully described in the above-mentioned Davies patent or like those of other cited references, hence it is deemed unnecessary to go into more detail with respect to the construction of the internal parts of assembly 10.

Again referring to FIG. 2, body element 25, which is comprised of a suitable refractory material to withstand high temperature, at its end opposite the immersion end, which is closed by means of the body member 24 which supports the contact portions of the assembly 12, has an enlarged cup-shaped portion 25a which surrounds the plug-in connector. This portion, during use of the assembly, serves to protect the plug-in connector elements both male and female from the heat radiated by the bath of molten material. Additionally, the enlarged cup-shaped portion 25a of the body member 25 will exert a buoyant force when, as indicated in FIG. 1, the assembly 10 is immersed into a bath of molten material to a depth such that the molten material reaches the largest diameter of the cup-shaped portion 25a. Since the entire unit is of very light weight construction the increased resistance to further penetration in the bath sensed by the operator serves to alert him to the fact that the assembly 10 has been immersed to a proper depth in the bath of molten material.

While a preferred embodiment of applicant's invention has been illustrated, it will be readily apparent to those skilled in the art that many different forms of the invention may be constructed and that one feature of applicant's invention may be usefully employed with or without the other.

What is claimed is:

1. An immersion temperature responsive assembly comprising, a refractory body structure having an immersion end and a connector end, said connector end having an enlarged hollow cup-shaped portion the cross-sectional area of which is several times the cross-sectional area of said immersion end to produce a buoyant force upon displacement of a liquid thereby for an indication of the proper depth of immersion, a quantity of refractory cement, a heat sensing element supported at the immersion end of said body by said cement and projecting outwardly, and plug-in connector means electrically connected to said heat sensing element, said plug-in connector means being supported by said body at the connector end thereof in a manner to be surrounded by and shielded from radiant heat by said hollow cup-shaped portion.

* * * * *